April 16, 1957     C. D. WEST     2,788,710

ELECTRO-OPTICAL DEVICES

Filed Aug. 14, 1952     2 Sheets-Sheet 1

INVENTOR
Cutler D. West

ATTORNEYS

April 16, 1957 C. D. WEST 2,788,710
ELECTRO-OPTICAL DEVICES
Filed Aug. 14, 1952 2 Sheets-Sheet 2

INVENTOR
Cutler D. West
BY
ATTORNEYS

United States Patent Office 2,788,710
Patented Apr. 16, 1957

2,788,710

ELECTRO-OPTICAL DEVICES

Cutler D. West, Cambridge, Mass., assignor to Polaroid Corporation, Cambridge, Mass., a corporation of Delaware Application August 14, 1952, Serial No. 304,408

5 Claims. (Cl. 88—61)

This invention relates to electro-optical devices and more particularly to devices of this character which operate to introduce a phase difference between linear components of polarized light passing through a transparent crystal by the application of an electric potential difference across the crystal.

Objects of the invention are to provide a light valve which employs a cubic crystal of the class $T_d$, especially cuprous halide crystals, i. e., cuprous chloride, cuprous bromide, cuprous iodide and cuprous fluoride, and particularly to employ sections of $T_d$ crystals which are cut in a preferred manner or geometry and are arranged in the device to obtain optimum results.

Other objects of the invention reside in the provision of electro-optical devices making use of one or more $T_d$ crystals and two or more light-polarizing filters which are optically aligned with each other, together with means for applying a predetermined potential of predetermined polarity across each crystal employed in the device.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
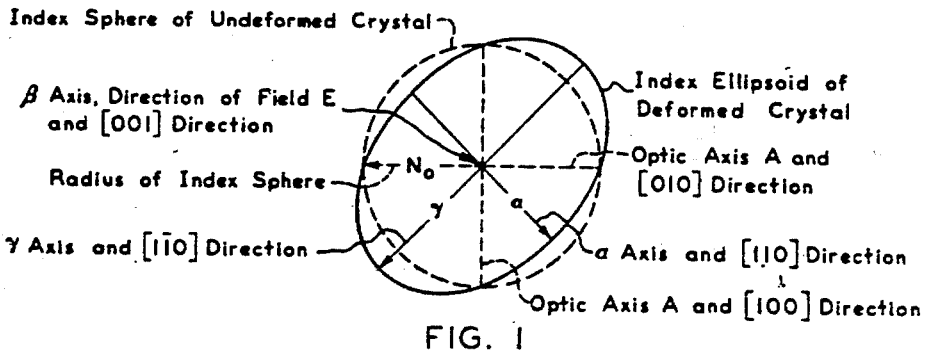
Figure 1 is a schematic projection for the index sphere and the index ellipsoid in a crystal section having a preferred longitudinal electro-optical effect.

In 1894, F. Pockels gave an explanation of the electro-optical effects in each of the twenty classes of piezoelectric crystals in a monograph entitled "The Effect of the Electrostatic Field on the Optical Properties of Piezoelectric Crystals," Gottingen, 1894. Pockels' monograph set up and proved his theories in regard to the electro-optical effects in the classes of crystals which it covered, and his explanation thereof has gained such acceptance that, in recent years, these effects have become known as "Pockels effects."

For the construction of substantially inertia-free electro-optical shutters, modulators and the like, it became evident in the 1930's that the Pockels effect in single transparent crystals of the twenty piezoelectric classes would be preferable over the more familiar Kerr effect in transparent polar liquids. A conventional embodiment of an electro-optical device utilizing the Pockels effect comprises a light source and, in optical alignment therewith, a polarizing filter, a crystal of a character capable of introducing a phase difference between linear components of polarized light upon the application of a field to the crystal, a second polarizing filter, usually crossed with respect to the first filter and on the side of the crystal farthest from the first filter, and a radiation detector such as a photosensitive cell or the like. The operating efficiency of electro-optical devices heretofore employed has been limited by reason of the nature or properties of the crystals used in such devices as well as in the failure of the art to utilize crystal sections of preferred geometry which permit the attainment of optimum results.

Ideally, crystals employed for this purpose should have the following characterization:

(1) High transparency over a spectral range.
(2) Complete optical isotropy in the absence of the electric field.
(3) A large electro-optic constant, that is a useful optical effect produced by a small field. In general, this will be found only in crystals which are good insulators, i. e., which support the field.
(4) Stability of the crystal and constancy of the electro-optic effect over a temperature range.
(5) Stability on exposure to light.
(6) Readily available.

The stability of the crystal on exposure to air is not necessarily of major importance since it will in general have to be covered anyway on two or four surfaces by the electrodes and by the light polarizers.

Class $T_d$ isotropic cubic crystals, where $T_d$ is the Schönflies notation for the symmetry class of these crystals, will in general meet this characterization and are as a whole useful for the purposes of this invention. Crystals of this nature, in accordance with the International notation for the symmetry class thereof, are also known as $\overline{4}32$ crystals. Additionally, certain crystals of this classification, for example the cuprous halides, and particularly cuprous chloride, are preferred since they more nearly approach the ideal characterization previously noted. Because of this and also because they are novel in the field of electro-optical devices, the invention will be specifically explained and illustrated in connection with the cuprous halide crystals, namely cuprous chloride, cuprous bromide, cuprous iodide and cuprous fluoride.

While this invention is in general concerned with electro-optical devices which employ $T_d$ crystals, an important concept resides in my discovery that the efficiency of these crystals in creating birefringence may be considerably enhanced and increased by the use of crystal sections having special geometries and the arrangement or positioning of the crystals in the electro-optical devices in a manner to best take advantage of these geometries. There are three special geometries of preferred interest for electro-optical applications, one of which is longitudinal and two of which are transverse. By these geometries, a crystal section may have parallel cube surfaces or parallel dodecahedron surfaces or parallel octahedron surfaces. Geometries of this nature permit a crystal section to be arranged in the electro-optical device so that the direction of the applied electric field and the direction of the light transmitted through the crystal are parallel to each other as in the longitudinal case mentioned or so that these directions are at right angles to each other as in the transverse cases previously mentioned.

With regard to class $T_d$ crystals, birefringence ($\gamma'-\alpha'$) induced by the field E is directly proportional to the latter and its sign reverses with the field $\gamma'-\alpha'=\Pi^T E$, where E is the value of the applied field and $\Pi^T$ is the electro-optic constant for the particular crystal section under consideration. This condition for class $T_d$ crystals holds true for any geometry of the crystal section employed, i. e., whether the crystal is cut at random or in accordance with any of the special geometries to be hereinafter described.

In a preferred longitudinal case, a class $T_d$ crystal is is cut to have two parallel cube faces, i. e., the (001) surfaces as denoted by the Miller indices or system for identifying crystallographic planes and surfaces. Such a crystal section is employed by applying the field to these faces and by directing light onto the crystal in a direction parallel to the field. With reference to the schematic projection of Fig. 1 showing the electro-optic effects projected onto the cube plane of the crystal, it may be noted that application of the field E in the direction indicated in the drawing takes the index sphere of radius $n_o$ and shown in dotted lines into a special triaxial ellipsoid shown in full lines. The $\gamma$ and $\alpha$ axes of the ellipsoid are the slow and fast axes of the crystal section. The dotted circle is the projection of the index sphere and shows that, in the field-free condition, the crystal is isotropic while the ellipse shows the crystal under an electric field. Numerals applied to Figs. 1, 2 and 3 are Miller indices and the letter A is employed to show the biaxial optic axes in Figs. 1 and 2.

Application of a field to a crystal section cut to have two parallel cube surfaces takes the index sphere of Fig. 1 into a triaxial ellipsoid of a nature such that $$\gamma-\beta=\beta-\alpha$$

$\beta=n_o$ and the angle between the biaxial optic axes A is 90°. By this crystal geometry and as shown in Fig. 1, the $\gamma$ and $\alpha$ axes lie parallel to the 110, $1\bar{1}0$ face diagonals in accordance with the notation of the Miller indices, and the $\beta$ axis lies parallel to the field and to the direction of propagation of the light. This longitudinal geometry will be preferred when the shutter is desired to act over an aperture of wide linear dimensions on an uncollimated beam of light. The transverse geometries, immediately to be described, are in general most practical over an aperture one of whose linear dimensions is relatively small.

Figure 2:
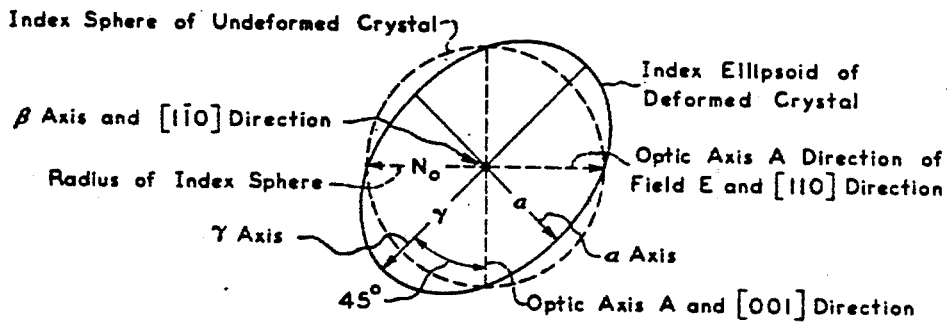
Fig. 2 is a schematic projection similar to Fig. 1 but for the index sphere and index ellipsoid for a crystal section having a preferred transverse electro-optical effect.
Figure 3:
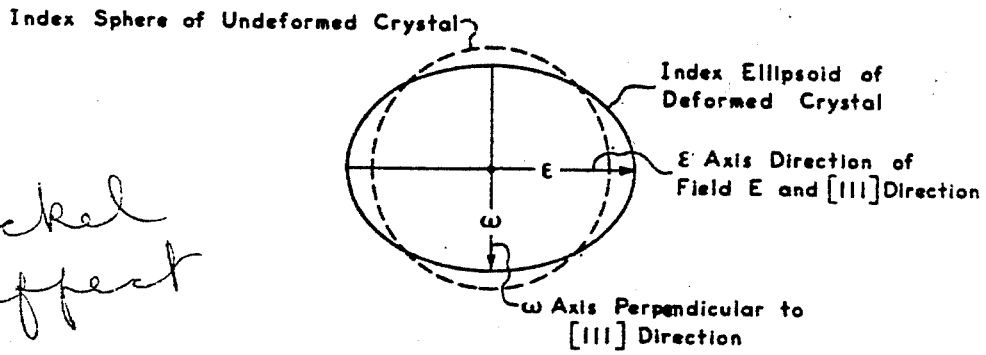
Fig. 3 is a schematic projection similar to Fig. 1 but for the index sphere and index ellipsoid for a crystal section having another transverse electro-optical effect.

In a preferred transverse case, illustrated in Fig. 2 by a schematic projection of the nature forming the subject of Fig. 1, a class $T_d$ crystal is cut to have a first pair of parallel dodecahedron surfaces and a second pair of parallel dodecahedron surfaces which intercept the first pair at right angles. The electric field is applied to opposite dodecahedron surfaces of one of these pairs, and light is directed onto the crystal in a direction normal to the second pair of dodecahedron surfaces. In this preferred transverse geometry, the crystal (with reference to the Miller indices) is cut into a 001/110/$1\bar{1}0$ rectangular block, the field is applied to opposite 110 surfaces, and the light travels normal to the $1\bar{1}0$ surfaces. The field takes the index sphere into the same special kind of triaxial ellipsoid as in the first case. In Fig. 2 the $\gamma$ and $\alpha$ axes lie in the $1\bar{1}0$ plane and are at 45° to the [110] and [001] or A axes. The $\beta$ axis is parallel to the direction of propagation of the light.

An important condition resides in the fact that the efficiency of the field in creating birefringence in a class $T_d$ crystal is dependent upon the geometry of the crystal section employed. The just-mentioned longitudinal and transverse geometry cases of all geometries are characterized by maximum efficiency for the field in birefringence creation.

Additionally, I have found that the triaxial ellipsoid for the longitudinal and the transverse cases illustrated in Figs. 1 and 2 is precisely the optimum one for an uncollimated light beam. A defect characteristic of electro-optical crystal devices heretofore employed has resided in the use of cystals having a narrow angular field of view. This fact has limited the practical application of such devices. For example, crystals of the tetragonal class $V_d$ such as ammonium dihydrogen phosphate, commonly called ADP, generally suffer from this defect and give under an electric field a triaxial ellipsoid which is far from the desired optimum. In contrast, crystals of the class $T_d$ possess, of all crystal classes, the largest possible useful angular aperture or angular field of view. Moreover, further advantage may be taken of this property of $T_d$ crystals by utilizing crystal sections possessing either of the geometries of the preferred longitudinal and transverse cases previously discussed.

In a second transverse case, illustrated in Fig. 3 by a schematic projection of the nature heretofore described, a class $T_d$ crystal is cut to provide a section having a first pair of parallel octahedron surfaces and a second pair of parallel surfaces which intercept the octahedron surfaces at right angles. The field is applied to the first-mentioned or octahedron pair of surfaces and light is directed onto the crystal in a direction normal to the second pair of surfaces.

With reference to Fig. 3, the field is applied to opposite 111 surfaces and takes the index sphere into a uniaxial ellipsoid whose optic axis is parallel to the field. Since this geometry results in a uniaxial ellipsoid as distinguished from the triaxial ellipsoid of Figs. 1 and 2, the characters $\omega$ and $\epsilon$ have been used in Fig. 3 to respectively indicate the fast and slow axes of the crystal so as to clearly differentiate this case from those previously described. The light can travel in any direction normal to the field. The efficiency of the field in this second transverse case in creating birefringence is slightly less than for the first two cases, namely by the factor $$\frac{\sqrt{3}}{2}=0.866$$

It will be recalled that a uniaxial ellipsoid is also created by the field in the Kerr effect in transparent polar liquids, and this was the basis of the first electro-optic devices. This uniaxial ellipsoid is also slightly inferior to the triaxial ellipsoid of the first two cases described above so far as uncollimated light beams are concerned.

Of all known class $T_d$ crystals, the cuprous halides, including mixed crystals, i. e., homogeneous solid solutions of cuprous halide, are preferred for electro-optic elements based on the Pockels effect because they give halfwave retardation with low voltage, transmit radiation over a wide wavelength range, and can be produced in the desired sizes. Moreover, their electrical characteristics are suitable for the purpose in question. These properties become apparent from a consideration of cuprous chloride.

For example the longitudinal halfwave voltage constant for cuprous chloride as found by measurement is about 6.2 kv. This value becomes impressive when compared with the constant for cubic zinc sulfide of 12.40 kv. as calculated from Schramm (see Ann. Physik 25 (1935) 309–336), it being specially noted that zinc sulfide is a class $T_d$ crystal. By further comparison, the corresponding constant for tetragonal ammonium dihydrogen phosphate (ADP), which as noted is a $V_d$ crystal, is given in the literature as 9.80 kv.

A section 2.06 mm. thick of cuprous chloride as grown from the melt has been found to be transparent over a wavelength range of from 0.40 micron through 15.0 microns and beyond. Thus such crystals are capable of transmitting infrared radiation as well as visible light and are available for infrared applications.

Ingots of cuprous chloride comprising pure, relatively large crystals may be grown in sealed glass vessels from the melt using the Bridgman method. Approximately 1 cm. cube blocks have been cut from such crystals. Ingots of cuprous halide may be treated, as by etching in hydrochloric acid or by auto-epitaxy, to develop facets corresponding to one of the tetrahedrons 111. One of these tetrahedral surfaces, called the A surface, is in a highly specular state while the opposite surface, called the B surface, is a matte surface. This property can be utilized to map the grain boundaries and establish the axes in each grain of the ingot and so permits accurate cutting thereof into blocks or sections possessing one of the three special geometries heretofore described.

Figure 4:
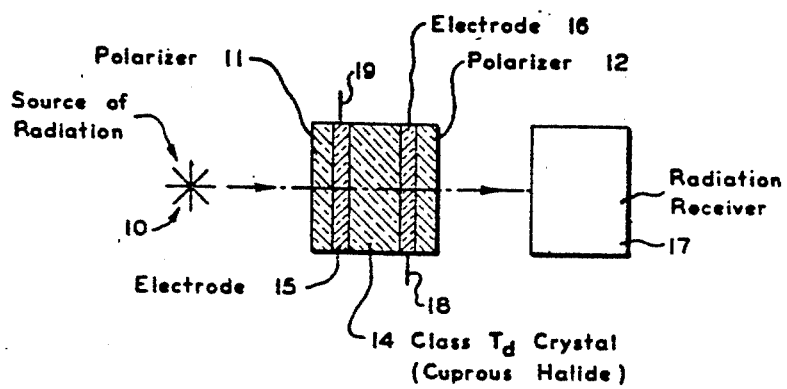
Fig. 4 is a diagrammatic, perspective view of a simplified embodiment of an electro-optical device of this invention utilizing a pair of spaced-apart light-polarizing filters with a cuprous halide crystal therebetween.

In Fig. 4, a diagrammatic and simplified embodiment of an electro-optical device is disclosed as comprising a source of radiation 10, such as a light source capable of giving off visible light and/or infrared radiation, two spaced-apart linear polarizers 11 and 12, a crystal 14 of the class $T_d$, such as a cuprous halide crystal, located between polarizers 11 and 12 and provided with suitable conductors 15 and 16 on appropriate faces thereof to permit the application of an electric potential difference thereto, and a radiation receiver 17, such as a photosensitive cell, a photographic film, the human eye or the like, for receiving radiation transmitted by the crystal 14. Leads 18 and 19 connected to a suitable source of potential difference (not shown) are also provided.

Fig. 4 illustrates an electro-optical source employing a crystal section having the geometry of the preferred longitudinal biaxial case so that the field and the incident radiation are applied to the crystal in the same direction. Consequently, the conductors 15 and 16 must be transparent, such as electrical conducting glass, for example Nesa glass, or they may comprise a metal coating or a metal sheet having transparent windows formed therein. The potential applied to the crystal may be derived from a D. C. source, and means (not shown) may be provided for varying the potential. Also, as will be understood by the art, it is possible to derive the potential from an A. C. source, in which event the crystal may be mounted in suitable damping material whereby to damp out piezoelectric resonance.

The polarizers 11 and 12 may be any conventional polarizers, for example sheet polarizers, of a character such as disclosed in U. S. Patents No. 2,173,304 to E. H. Land and H. G. Rogers, No. 2,237,567 to E. H. Land, No. 2,289,712 and No. 2,270,323 to E. H. Land and C. D. West, and No. 2,494,686 to R. P. Blake. Preferably, linear polarizers are employed.

The operation of the device of Fig. 4 will be well understood by the art. Assuming that polarizers 11 and 12 are linear polarizers, the device acts as a shutter which is opened to permit the transmission of radiation from the source 10 to the receiver 17 upon the application of a potential to the crystal 14 when the polarizers 11 and 12 are crossed with respect to each other. On the other hand, if the polarizing axes of the polarizers 11 and 12 are parallel, the device acts as a shutter to decrease transmission of radiation from the source 10 to the receiver 17 when a potential is applied to the crystal 14. As will be well understood, a variation or modulation of the potential may be used to control or modulate the radiation transmission. When a halfwave potential is applied to the crystal 14, the light valve will be fully opened or fully closed, depending on the orientation of the polarizers 11 and 12. In electro-optical devices of this character which act as a shutter, the polarizer axes are always at 45° to one of the axes of the index ellipse as, for example, to the $\alpha$ or $\gamma$ axes in the cases illustrated in Figs. 1 and 2, or to the $\omega$ or $\epsilon$ axes as in the case illustrated in Fig. 3.

Figure 5:
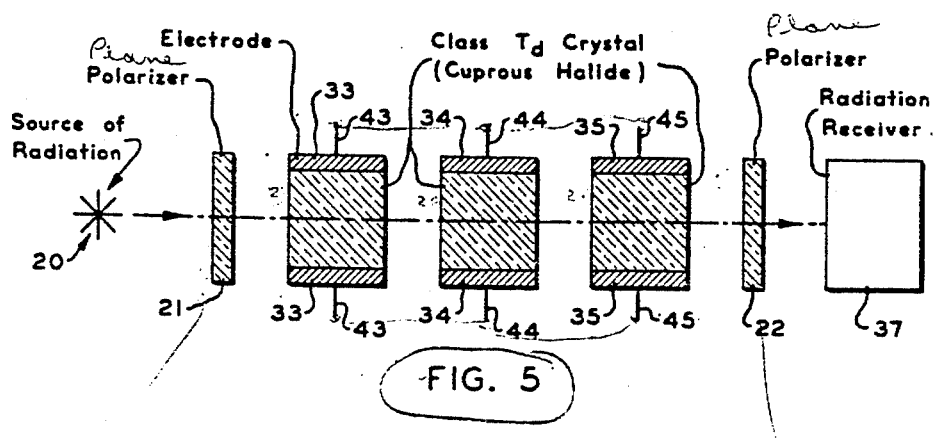
Fig. 5 is a schematic cross section of a modified embodiment of a light valve using a plurality of cuprous halide crystals and light-polarizing filters arranged in a pile.

Fig. 5 discloses another embodiment of an electro-optical device wherein there is shown a source of radiation 20 and, in alignment therewith, in the order named, a linear or plane polarizer 21, crystals 23, 24 and 25 of the class $T_d$, such as cuprous halide crystals, a second plane polarizer 22 and a radiation receiver 37. All elements of the device of Fig. 5, so far described, are similar to the elements of the device of Fig. 4. Electrode pairs 33, 34 and 35 are shown as associated respectively with crystals 23, 24 and 25 and permit the crystals to be connected through leads 43, 44 and 45 to the same source of potential or to different sources of potential whereby the same or different voltages may be impressed upon the different crystals.

The crystal elements 23, 24 and 25 are represented as having the preferred transverse geometry whereby the electrodes 33, 34 and 35 are positioned in parallel relation to the direction of the light path or, to put it another way, whereby the direction of the light path and the direction of the applied field are at right angles to each other. Consequently, the electrodes 33, 34 and 35 may be opaque as shown. In the arrangement of Fig. 5, an air gap is disclosed between each crystal element 23, 24 and 25 whereby to eliminate possible sparking. Other insulating means may be employed for this purpose. Operation of the device of Fig. 5 is similar to that of the device of Fig. 4 and needs no detailed explanation.

The electro-optical devices of Figs. 4 and 5 are illustrated without the use of collimating means between the source of radiation and the first polarizer of the system. This practice is made possible because of the wide angular aperture possessed by crystals of the class $T_d$ as hereinbefore set forth.

It is particularly pointed out that the use of the special transverse geometry for crystal sections is not limited to a device which employs a plurality of crystal elements, but may be used in a device employing a single crystal element. Also, the invention includes the use of a plurality of crystal sections cut in the preferred longitudinal geometry. In the latter instance, the crystal elements may be arranged in a stack or pile, and it is possible to mount a common conductor between each adjacent pair of crystals. It should also be recognized that it is possible to use, in the same electro-optical device, one or more crystal sections having the preferred longitudinal geometry and one or more crystals having the preferred transverse geometry. Furthermore, it is possible, when employing an arrangement which utilizes each of a plurality of crystal elements in an individual circuit, to connect the individual elements to individual sources of potential so that each individual element may have polarity of predetermined direction.

In Fig. 5, an electro-optical device has been shown wherein the crystals thereof are arranged in series so that radiation propagated by the source passes successively through each crystal of the device. It is within the concept of the invention to provide an electro-optical device making use of a plurality of crystals which are arranged in parallel so that radiation or light from the source passes simultaneously through the individual crystals of the device.

It has been pointed out that plane or linear polarizers will, in general, be preferred although for special cases it may be desirable to utilize either circular or elliptical polarizers.

Additionally, the polarizers may be neutral, or they may be colored. Consequently, the invention also embraces within its scope the use of $T_d$ crystals to provide a variable polarizing color filter such as that disclosed in Patent No. 2,493,200 to E. H. Land by the use of a plurality of crystals arranged in a pile or in a stack and separated by colored light-polarizing filters.

In the literature there will be found about fifty crystals which are known to belong or are believed to belong to the class $T_d$. While the invention has been specifically illustrated with cuprous halide crystals, which are of the class $T_d$, it is to be understood that the concepts set forth herein are applicable to all simple crystals and mixed crystals of the symmetry class with which this invention is concerned.

It has been previously mentioned that cuprous halide crystals of thicknesses practical for the devices described transmit radiation of an approximate wavelength range of from 0.40 micron to 15.0 microns. This range extends from the lower limit of the visible spectrum through the infrared region of the spectrum and, as used in the specification and claims herein, the term "light" is intended to embrace wavelengths which fall within this range.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A device for controlling the transmission of incident radiation of the optical spectrum comprising a first optical polarizing means having given polarizing characteristics positioned in the path of said incident radiation, a crystal section of given thickness cut from an isometric crystal of the $T_d$ class so as to have a pair of plane parallel polished surfaces substantially normal to a crystallographic reference axis of the crystal, said crystal section having relatively high transmission characteristics for radiation of said optical spectrum and being normally devoid of an optic axis and, accordingly, nonbirefringent, said crystal section being positioned in said device so that said plane parallel surfaces lie in the path of and are substantially normal to the axial ray of said radiation transmitted by said device, electrically conducting means superposed on at least a portion of each of said plane parallel surfaces, means for applying a given electric potential to said electrically conducting means to create an electric field in a given direction within said crystal section, and a second optical polarizing means having given polarizing characteristics with respect to those of said first optical polarizing means positioned in the path of polarized radiation from said crystal section and substantially normal to said axial ray, said crystal section being rendered temporarily biaxial when said electric potential is applied, the aforesaid position of said electrically conducting means with respect to said plane parallel surfaces of the crystal section and the aforesaid position of said crystal section surfaces with reference to said axial ray, taken with said cut of surfaces with respect to said crystallographic reference axis, being such that when said electric potential is applied the biaxial optic axes thereby provided in said crystal section are substantially at 90° with respect both to said axial ray and to the direction of said electric field.

2. A device for controlling the transmission of incident light comprising a first linearly light-polarizing means having a given polarizing direction positioned in the path of said incident light, a crystal section of given thickness cut from an isometric cuprous halide crystal of the $T_d$ class so as to have a pair of plane parallel polished surfaces substantially normal to a crystallographic reference axis of the crystal, said crystal section, in an electrically unexcited state, being devoid of an optic axis and, accordingly, nonbirefringent, said crystal section being positioned in said device so that said plane parallel surfaces lie in the path of and are substantially normal to the axial ray of said light which is transmitted by said device, a pair of electrically conducting surfaces comprising a surface superposed on at least a portion of each of said plane parallel crystal section surfaces, means for applying a given electrical potential across said electrically conducting surfaces to create an electric field in a given direction within said crystal section, and a second linearly light-polarizing means having a given polarizing direction with respect to that of said first light-polarizing means positioned in the path of polarized light from said crystal section substantially normal to said axial ray, said crystal section being rendered temporarily biaxial when said electric potential is applied, the aforesaid position of said electrically conducting surfaces with respect to said plane parallel surfaces of the crystal section and the aforesaid position of said crystal section surfaces with reference to said axial ray, taken with said cut of said surfaces with respect to said crystallographic reference axis, being such that when said electric potential is applied, the biaxial optic axes thereby provided in said crystal section are substantially at 90° with respect both to said axial ray and to the direction of said electric field.

3. A device for controlling the transmission of incident light comprising a first linearly light-polarizing means having a given polarizing direction positioned in the path of said incident light, a crystal section of given thickness cut from an isometric cuprous halide crystal of the $T_d$ class as to have a pair of plane parallel polished surfaces substantially normal to a crystallographic reference axis of the crystal, said crystal section being normally devoid of an optic axis and, accordingly, nonbirefringent, said crystal section being positioned in said device so that said plane parallel surfaces lie in the path of and are substantially normal to the axial ray of said light which is transmitted by said device, a pair of electrically conducting surfaces comprising a surface superposed on at least a portion of each of said plane parallel crystal section surfaces, means for applying a given electric potential across said electrically conducting surfaces to create an electric field in a given direction within said crystal section, and a second linearly light-polarizing means having a given polarizing direction with respect to that of said first light-polarizing means positioned in the path of polarized light from said crystal section substantially normal to said axial ray, said crystal section being rendered temporarily biaxial when said electric potential is applied, the aforesaid position of said electrically conducting surfaces with respect to said plane parallel surfaces of the crystal section and the aforesaid position of said crystal section surfaces with reference to said axial ray, taken with said cut of said surfaces with respect to said crystallographic reference axis, being such that when said electric potential is applied, the biaxial optic axes temporarily provided in said crystal section are substantially at 90° with respect to one another, to said axial ray and to the direction of said electric field, said axial ray and the direction of said electric field being in substantially parallel relation to one another.

4. A device for controlling the transmission of incident light comprising a first linearly light-polarizing means having a given polarizing direction positioned in the path of said incident light, a crystal section of given thickness cut from an isometric cuprous halide crystal of the $T_d$ class so as to have a pair of plane parallel polished surfaces substantially normal to a crystallographic reference axis of the crystal, said crystal section being normally devoid of an optic axis and, accordingly, nonbirefringent, said crystal section being positioned in said device so that said plane parallel surfaces lie in the path of and are substantially normal to the axial ray of said light which is transmitted by said device, a pair of electrically conducting surfaces comprising a surface superposed on at least a portion of each of said plane parallel crystal section surfaces, means for applying a given electric potential across said electrically conducting surfaces to create an electric field in a given direction within said crystal section, and a second linearly light-polarizing means having a given polarizing direction with respect to that of said first light-polarizing means positioned in the path of polarized light from said crystal section substantially normal to said axial ray, said crystal section being rendered temporarily biaxial when said electric potential is applied, the aforesaid position of said electrically conducting surfaces with respect to said plane parallel surfaces of the crystal section and the aforesaid position of said crystal section surfaces with reference to said axial ray, taken with said cut of said surfaces with respect to said crystallographic reference axis, being such that when said electric potential is applied, the biaxial optic axes temporarily provided in said crystal section are angularly disposed with respect both to said axial ray and to the direction of said electric field by more than 45°, said axial ray and the direction of said electric field being in substantially parallel relation to one another.

5. In an optical system for controlling the transmission of incident light, positioned between two light-polarizing elements having given polarizing characteristics and positioned normal to an axial ray transmitted by said system, a section shaped from a single crystal of a cuprous halide of the class $T_d\text{--}\overline{43}\overline{2}$ having relatively high transmission characteristics for said light and which, in the absence of an applied electric potential, is devoid of an optic axis and, accordingly, nonbirefringent and which has a pair of plane parallel polished surfaces cut substantially perpendicular to a crystallographic reference axis of the crystal, namely, perpendicular to a lattice direction [001] and positioned in the path of and substantially at 90° to said axial ray transmitted by said system, electrically conducting means superposed on each of said plane parallel surfaces, means for applying a given electric potential across said plane parallel surfaces to provide an electric field in a given direction within said crystal section, said crystal section being rendered temporarily biaxially birefringent when said electric potential is applied, said position of said electrically conducting means with respect to said crystal section plane parallel surfaces and said position of said surfaces with reference to said axial ray, taken with said cut of said surfaces with respect to said lattice direction [001], being such that when said electric potential is applied the biaxial optic axes thereby provided in said crystal section are substantially at 90° with respect to one another, to said axial ray, and to the direction of said electric field.

References Cited in the file of this patent

UNITED STATES PATENTS

| | | |
|---|---|---|
| 2,064,289 | Cady | Dec. 15, 1936 |
| 2,418,779 | Leverenz | Apr. 8, 1947 |
| 2,451,966 | Massa | Oct. 19, 1948 |
| 2,493,200 | Land | Jan. 3, 1950 |
| 2,521,642 | Massa | Sept. 5, 1950 |
| 2,591,701 | Jaffee | Apr. 8, 1952 |
| 2,600,962 | Billings | June 17, 1952 |

OTHER REFERENCES

Electrical Communication, vol. 23, 1946, pages 445–459.

Proceedings of the IRE, vol. 37, No. 12, December 1949, Standards on Piezoelectric Crystals, pages 1378–1395.